(No Model.)
W. SPRAGUE.
LIFTING JACK.
No. 262,188. Patented Aug. 1, 1882.
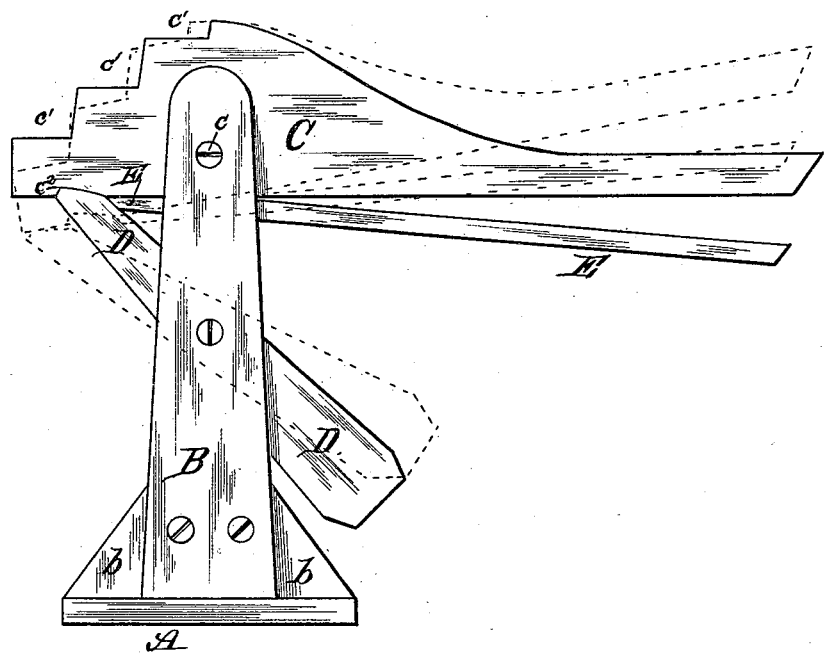
WITNESSES
INVENTOR,
Ward Sprague,
Howard A. Turn.
Attorney

UNITED STATES PATENT OFFICE.

WARD SPRAGUE, OF SANDY CREEK, NEW YORK, ASSIGNOR OF ONE-HALF TO JUSTUS LYMAN BULKLEY, OF SAME PLACE.

LIFTING-JACK.

SPECIFICATION forming part of Letters Patent No. 262,188, dated August 1, 1882.

Application filed June 12, 1882. (No model.)

*To all whom it may concern:*

Be it known that I, WARD SPRAGUE, a citizen of the United States, residing at Sandy Creek, in the county of Oswego and State of New York, have invented certain new and useful Improvements in Lifting-Jacks, of which the following is a specification, reference being had therein to the accompanying drawing.

My invention relates to wagon-jacks; and it consists in the construction and arrangement of its several parts, as will be hereinafter fully set forth, and pointed out in the claims.

The drawing represents a side elevation of my jack.

A is the base, to which are secured the vertical standards B, they being braced by the braces $b\ b$, as shown.

Pivoted between the upper ends of the braces, at $c$, is the lever C. It is enlarged at its pivotal point, and is provided with a series of graduated steps, $c'$, whereby it can be adapted to axles of different elevations.

A notch, $c^2$, is cut in the under side of the lever C, in front of the pivoted point, and into this notch enters the upper end of the lock-bar D. The lock-bar D is pivoted between the standards B, below the lever C, as shown. Its lower end is enlarged, so as to keep the upper end of the bar pressed against the under side of the lever C, and to enter the notch $c^2$ whenever the lever C is brought into the proper position.

E is the escapement-lever. It is pivoted to the under side of the lever C, between the standards, and extends to the inner end of the notch $c^2$. Its rear portion extends to the rear end of the lever C, and is operated in combination therewith in releasing the lock-bar.

In the operation of the jack the lever E operates to release the lock-bar from the notch $c^2$. When it is desired to elevate an axle the rear end of the lever C is elevated, which depresses the graduated steps $c'$. The jack is then pushed under the axle until the proper step $c'$ comes against the axle. The lever E is then released and its rear end drops, bringing its front end against the under side of the lever C next the notch $c^2$, as shown. The lever C is then depressed and the axle raised until the end of the lock-bar enters the notch $c^2$, and by which the parts are held in position. When it is desired to lower the axle the lever C is depressed sufficiently to release the strain upon the lock-bar, which is then thrown out of the notch $c^2$ by the lever E, and the axle lowered.

What I claim is—

1. The combination of the lock-bar D, pivoted between the standards B, with the lever C, pivoted between the standards B, and provided with a series of graduated steps, $c'$, and a notch, $c^2$, substantially as shown and described.

2. In a lifting-jack, the escapement-lever E, pivoted to the under side of the lever C, and the lock-bar D, substantially as shown and described.

3. The combination of the lever C, pivoted between the standards B, provided with a series of graduated steps, $c'$, a notch, $c^2$, and having pivoted to its under side the escapement-lever E, with the lock-bar D, pivoted between the standards B and adapted to enter the notch $c^2$, substantially as shown and described.

In testimony whereof I affix my signature in presence of two witnesses.

WARD SPRAGUE.

Witnesses:
L. F. TIFFT,
MARTIN L. MAY.